Figure 1:
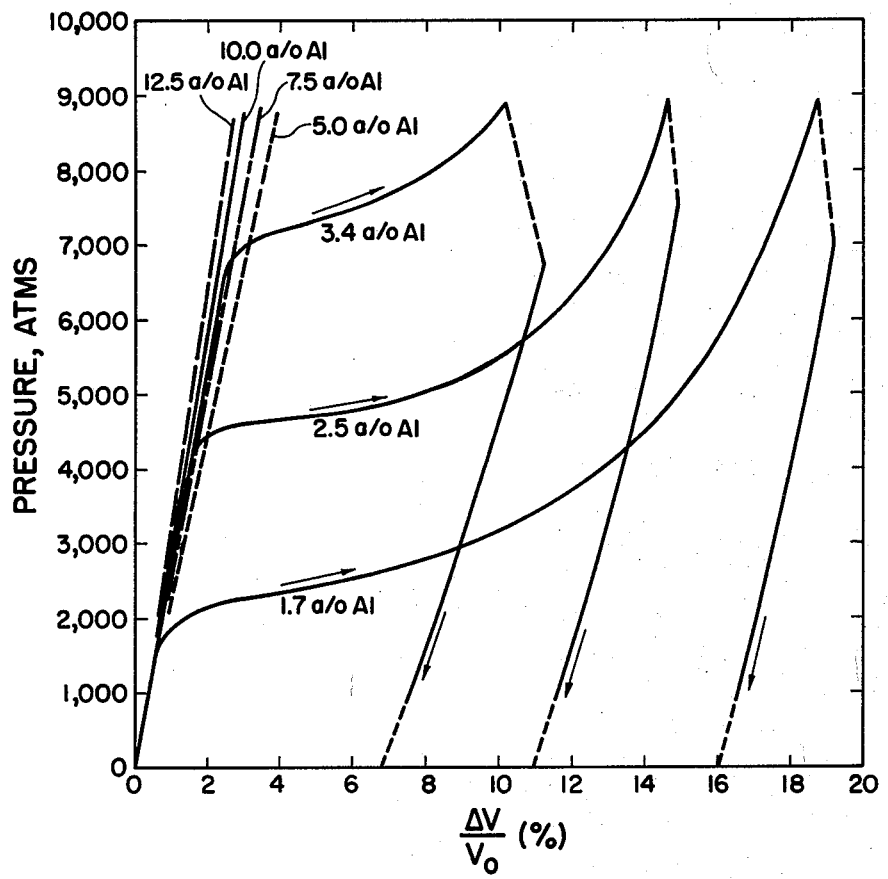

Dec. 22, 1964 R. O. ELLIOTT ETAL 3,162,527
PLUTONIUM ALLOYS CONTAINING CONTROLLED AMOUNTS OF
PLUTONIUM ALLOTROPES OBTAINED BY
APPLICATION OF HIGH PRESSURES
Filed June 2, 1959 15 Sheets-Sheet 1

WITNESSES:
Roy H. Smith, Jr.
Victor H. Laslo.

INVENTOR.
Reed O. Elliott
Karl A. Gschneidner, Jr.
BY

United States Patent Office 3,162,527
Patented Dec. 22, 1964

3,162,527
PLUTONIUM ALLOYS CONTAINING CONTROLLED AMOUNTS OF PLUTONIUM ALLOTROPES OBTAINED BY APPLICATION OF HIGH PRESSURES
Reed O. Elliott and Karl A. Gschneidner, Jr., Los Alamos, N. Mex., assignors to the United States of America as represented by the United States Atomic Energy Commission
Filed June 2, 1959, Ser. No. 817,679
4 Claims. (Cl. 75—122.5)

The present invention deals with alloys of plutonium containing minor amounts of delta stabilizing elements, and is particularly concerned with such alloys in which the final allotropic composition of the plutonium is a predetermined ratio dictated by the physical characteristics required in the end product, together with methods for obtaining such alloys. Such alloys are useful as nuclear fission reactor fuels in the form of solid rods or other shapes.

As is now well established, unalloyed plutonium has six allotropic forms in the solid state, each form existing under equilibrium conditions at a particular range of temperatures and each having a distinct set of physical characteristics. Thus the alpha allotrope, the stable form at room temperatures, has the highest density, 19.7 g./cc., the greatest strength and hardness, and a positive coefficient of thermal expansion, while the delta allotrope has the lowest density, 15.9 g./cc., lower strength and hardness but greater ductility than alpha plutonium, and a negative coefficient of thermal expansion. The superior strength and hardness of alpha plutonium make it exceedingly difficult to fabricate by ordinary methods, though the same qualities are highly desirable in the finished piece. On the other hand, the superior ductility of delta plutonium renders it readily machinable, though it is inferior to the alpha form in strength and hardness, and has the further unfortunate characteristic of a negative coefficient of thermal expansion. The contraction of the metal on heating is undesirable in a nuclear fission reactor fuel, as such a contraction leads to greater reactivity and thus imposes a greater control problem.

Past efforts to develop solid plutonium fuels which are capable of ready fabrication have been concentrated on methods of preserving or stabilizing the delta allotrope at room temperature. Since there is no method known for thus stabilizing the delta phase of unalloyed plutonium, such methods have invariably consisted in adding a minor amount of an element such as gallium to the plutonium, heating the mixture to an elevated temperature to convert to the delta allotrope and insure a homogeneous mixture, and rapidly cooling the same to room temperature to insure a maximum retention of the delta phase. This product is generally referred to as delta stabilized plutonium, and is apparently quite stable at room temperature and atmospheric pressure, provided it is not cold worked. The final step of the prior art is the machining of such a delta stabilized plutonium shape to final dimensions, after which it is either used directly or is given a second heat treatment to reconvert to the delta phase any plutonium transformed to other allotropes in the fabrication process.

While solid fuel rods thus containing plutonium entirely or predominantly in the delta state may have been satisfactory for some purposes, their employment is not altogether free of disadvantages. Small voids and cracks are usually present in the final product as a result of the quenching step and/or the inevitable partial conversion to the alpha phase, however small. Such flaws are undesirable because they make fabrication more difficult and, if retained in the final product, because they decrease the nuclear efficiency of the reactor.

In addition, many such alloys preserve the negative coefficient of thermal expansion characteristic of delta plutonium, e.g., delta plutonium stabilized with zinc requires a minimum addition of 3.4 atom percent (a/o) zinc to insure a positive coefficient, and delta plutonium stabilized with cerium requires a minimum of 8.0 a/o Ce to achieve the same result.

Another disadvantage of such prior art fuel alloys is the fact that their densities are essentially fixed. Since the plutonium is essentially all of the delta phase and the additive is usually of low molecular weight or is added in a minor proportion, or both, the density is essentially that of the delta allotrope. This inflexibility has made it necessary for reactor designers to design to such density, whereas in many cases a higher density could conveniently have been exploited if it had been available.

As indicated above, the prior art delta stabilized plutonium obtained by the rapid cooling of the metal with a small alloying addition is apparently quite stable at room temperature and atmospheric pressure. The condition, however, is not one of equilibrium, as the delta allotrope transforms to other phases when the alloy is heat treated, compressed or worked. The alloys are only metastable, and transform to a more stable, lower energy state under outside influences. (Although energy must be supplied to the alloy to initiate the delta-alpha transformation, the plutonium gives up more than this energy in the transition.) Such transformations are undesirable in fuel rods during the course of operation, as the concomitant changes in physical properties will cause drastic changes in the mode of operation of the reactor, and may even produce conditions which necessitate a shutdown of the reactor. For one example, if in a jacketed solid fuel rod there is a sudden transformation from delta to alpha plutonium, the contraction may rupture the jacket and thus permit leakage of the fuel and fission products to the other parts of the reactor, a mishap which would require a lengthy shutdown for decontamination of such parts and replacement of the ruptured fuel rod.

Through a course of considerable experimental investigation by the present inventors, it has been discovered that high pressure techniques may be used to overcome many of the aforementioned defects of the prior art. The present inventors have found that most delta stabilized plutonium alloys may be partially transformed into the alpha phase (and one into beta) by pressure alone. In the course of such pressure treatment, any previously present voids and cracks are filled up, and no new ones are introduced. In most such pressure treatments, the transformation is irreversible, i.e., no reverse transformation takes place when the pressure is released. For certain alloying additions, however, the present inventors have also discovered that with a certain minimum or higher content of the delta stabilizing additive, true thermodynamic equilibrium is obtained. When the latter alloys are compressed sufficiently to cause a phase transformation and the pressure is released, the plutonium retransforms into the delta phase. Such alloys are particularly desirable when the reactor design calls for fuel elements utilizing the low density of the delta allotrope, especially at high temperatures, as operation below the transformation pressure will insure against transformations during the course of operation, at temperatures as high as those for which the particular delta alloy is stable, a minimum of 450° C. and as high as 700° C. Of course, the alloys undergoing irreversible phase transformation under maximum pressure are also in a state of equilibrium after transformation, the distinction being that such alloys consist of a mixture of allotropes while the compositions undergoing reversible transformation contain entirely or essentially delta plutonium. Such alloys will retain their stability indefinitely at temperatures within a range of 100 to 200° C. above room temperature.

It is therefore an object of the present invention to provide plutonium base alloys free of voids and cracks, and methods for obtaining such alloys.

A further object is to provide such alloys and methods in which the allotropic composition of the plutonium and thus the physical characteristics of the alloy may be controlled over a wide range.

An additional object is to provide such alloys and methods in which the alloys are in a state of true thermodynamic equilibrium.

Another object is to provide delta stabilized plutonium base alloys which experience only reversible phase transformations under pressure.

One other object is to provide plutonium alloys in which the plutonium is stabilized at room temperature as the beta allotrope, and methods for obtaining such alloys.

The above and further objects are achieved according to the present invention by the general expedient of compressing solid specimens of delta stabilized plutonium alloys (or beta in some cases) to a pressure sufficient to insure mass transformation of the delta (beta) phase to lower allotropes of plutonium. Since the behavior of such alloys under pressure may vary somewhat with their prior thermal treatment, the present inventors followed a plan of preparing their specimens by melting and casting said compositions of the alloys, homogenizing such specimens at a temperature of 425–475° C. for a minimum of 200 hours and air quenching the specimens to room temperature. The cooled specimens were machined to right cylinders 0.434" in diameter and 1.5–1.7" long. The delta stabilized elements thus investigated and disclosed here include aluminum, gallium, zinc, cerium, and to a lesser extent indium. Other plutonium alloys containing copper, germanium, cadmium and tin were prepared, but no delta phase was found in any of these systems at room temperature. Other potential delta stabilizing additions which may be used include thallium, zirconium, hafnium and the other rare earth metals, although not all of these elements have the best nuclear properties. The alloys disclosed herein are all binary alloys of plutonium and an additional element, but the methods disclosed will be applicable to plutonium stabilized in the delta (or beta) phase with more than one additive, even though one or more such additives may be mere diluents.

The specimens were examined using metallographic and X-ray defraction methods both before and after compression. The densities of these alloys were also measured before and after compression, using a method which gave densities to a precision of ±0.03 g./cc. The hardnesses of the specimens were likewise measured before and after compression.

The delta stabilized alloys prepared as above were subjected to high pressure in a high pressure cylinder having a bore approximately equal to the diameter of the specimen. The specimen was placed inside this bore on a stationary piston, and pressure was applied through a movable piston and transmitted hydraulically to the specimen by glycerin, the latter being used as the pressure-transmitting medium because it does not react with plutonium and because it is relatively incompressible. A Baldwin SR–4 load cell, calibrated for pressure measurement at the solidification point of mercury, 8850 atmospheres and 7.5° C., was used to measure the pressures. Dial indicators located on opposite sides of the cylinder were used to measure linear displacement of the movable piston. Volume changes in the specimens required not only calculation from the dial indicator readings, but also corrections for compression of the glycerin, expansion of the cylinder and contraction of the pistons, resulting in calculated volumes with an accuracy of ±10% of the values listed. Pressures required correction for the frictional resistance of the pistons.

Figure 2:
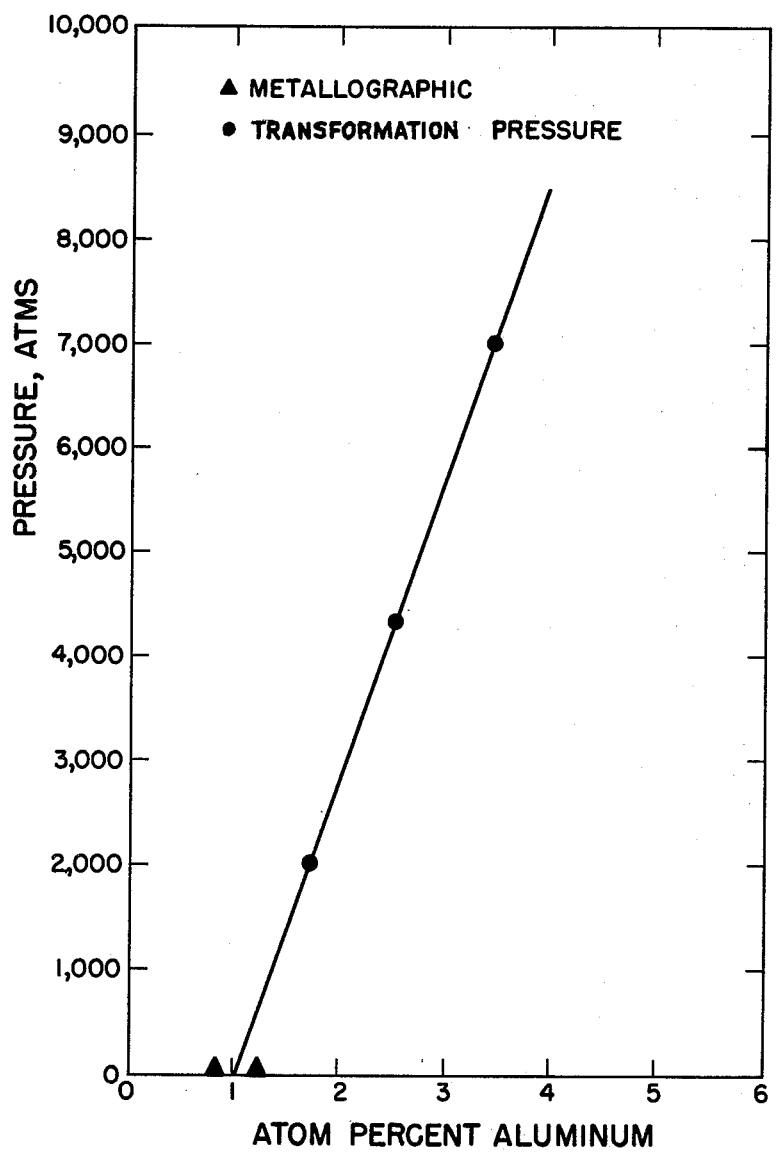
Figure 3:
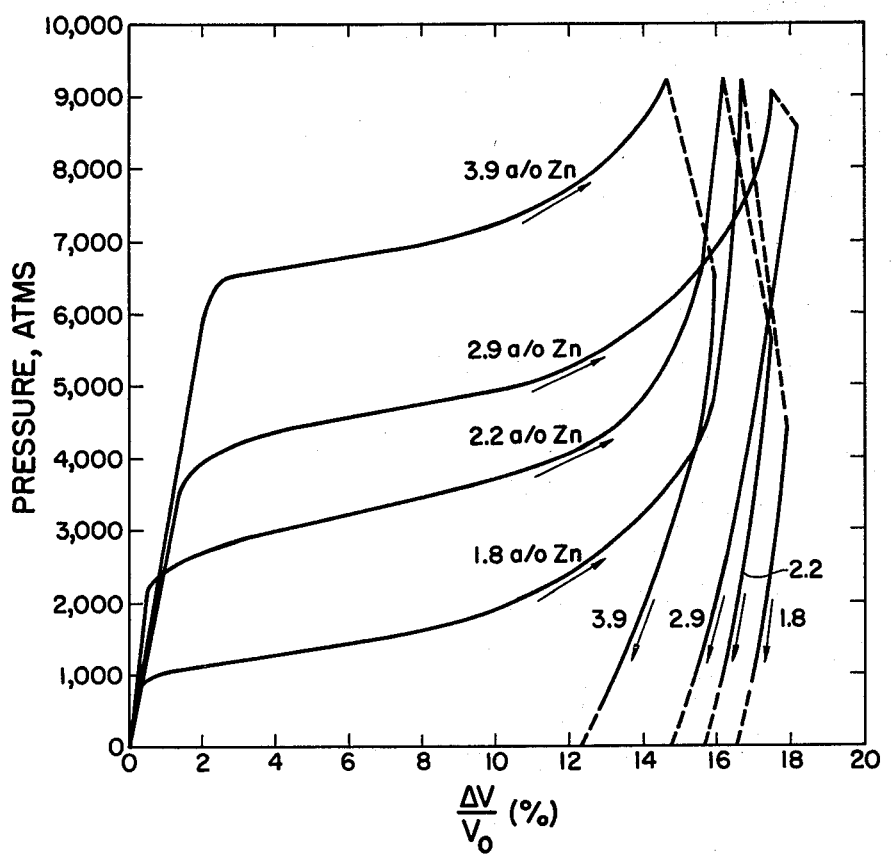
Figure 4:
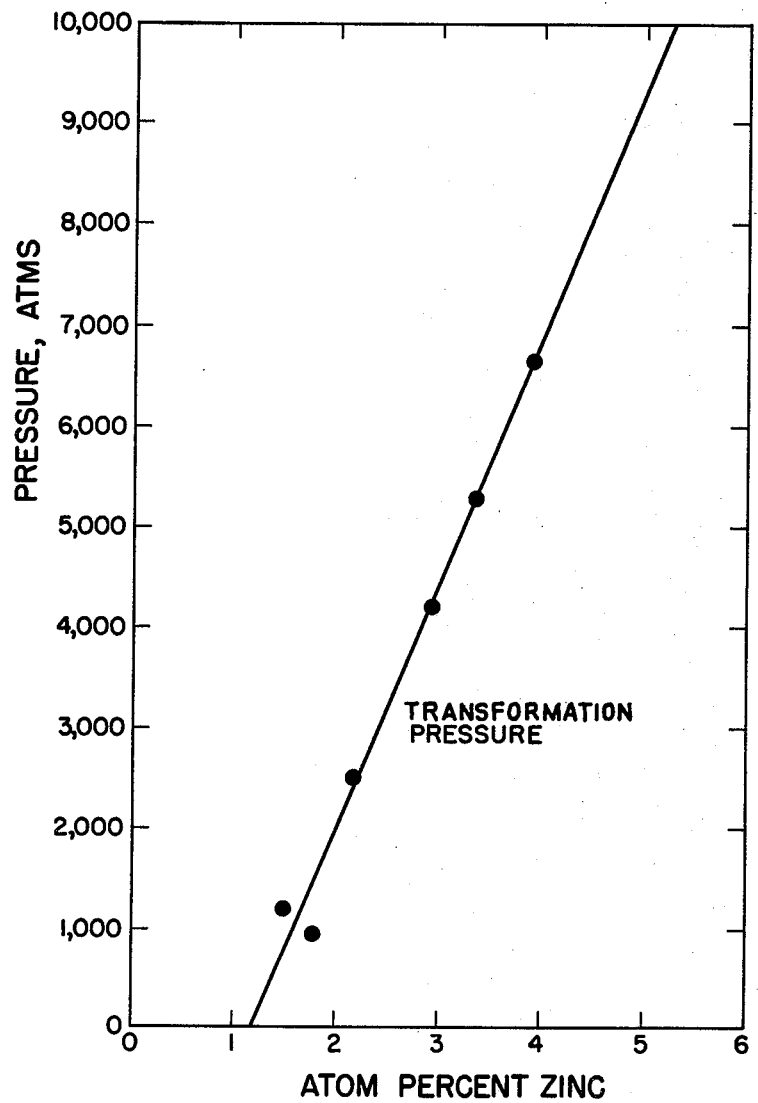
Figure 5:
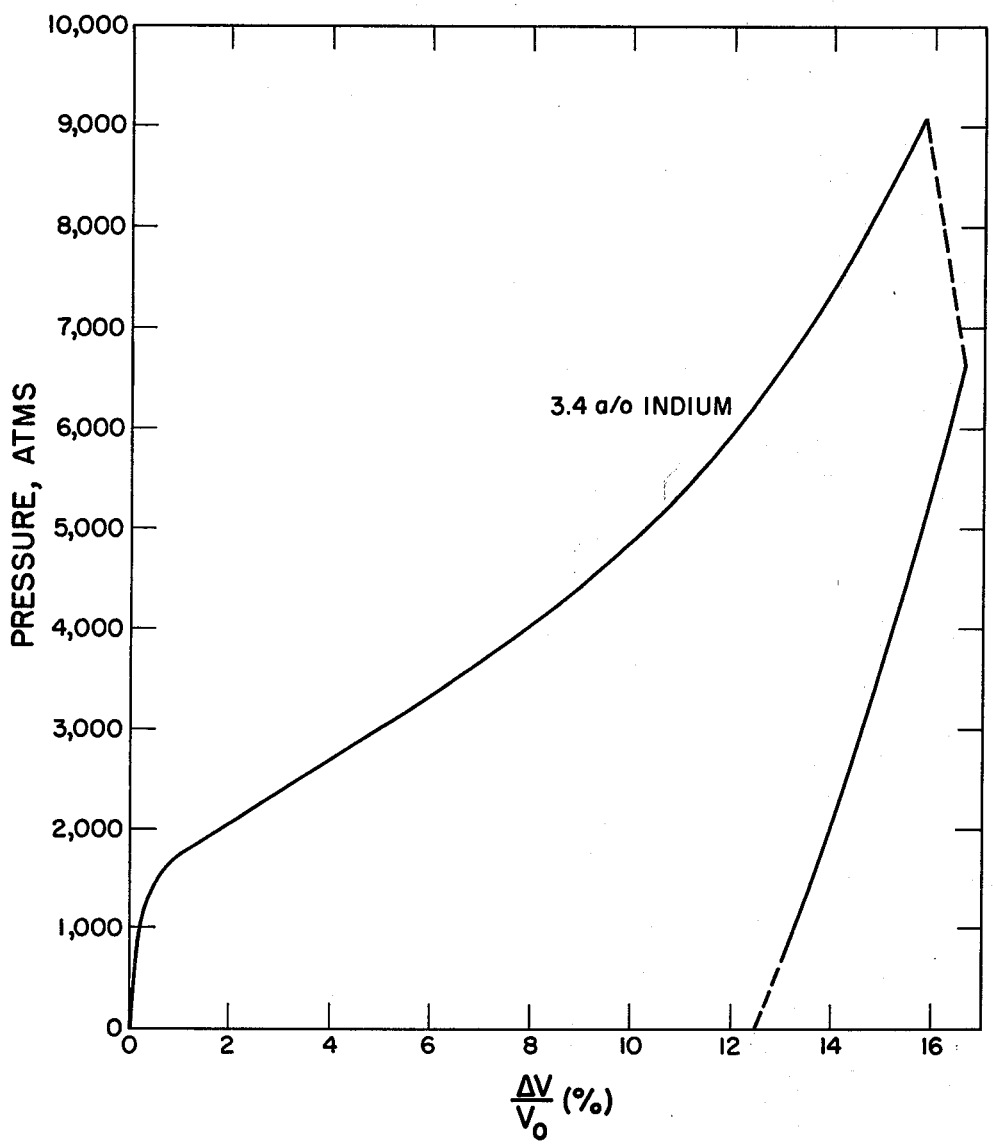
Figure 6:
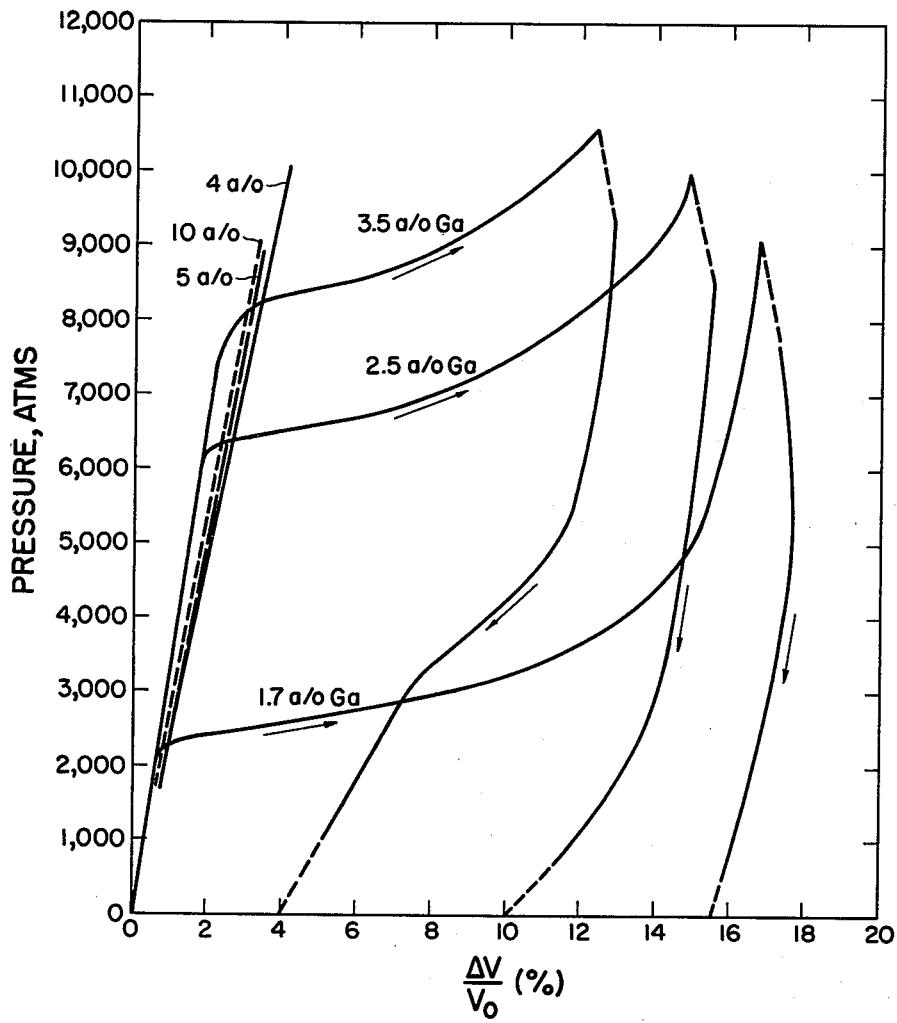
Figure 7:
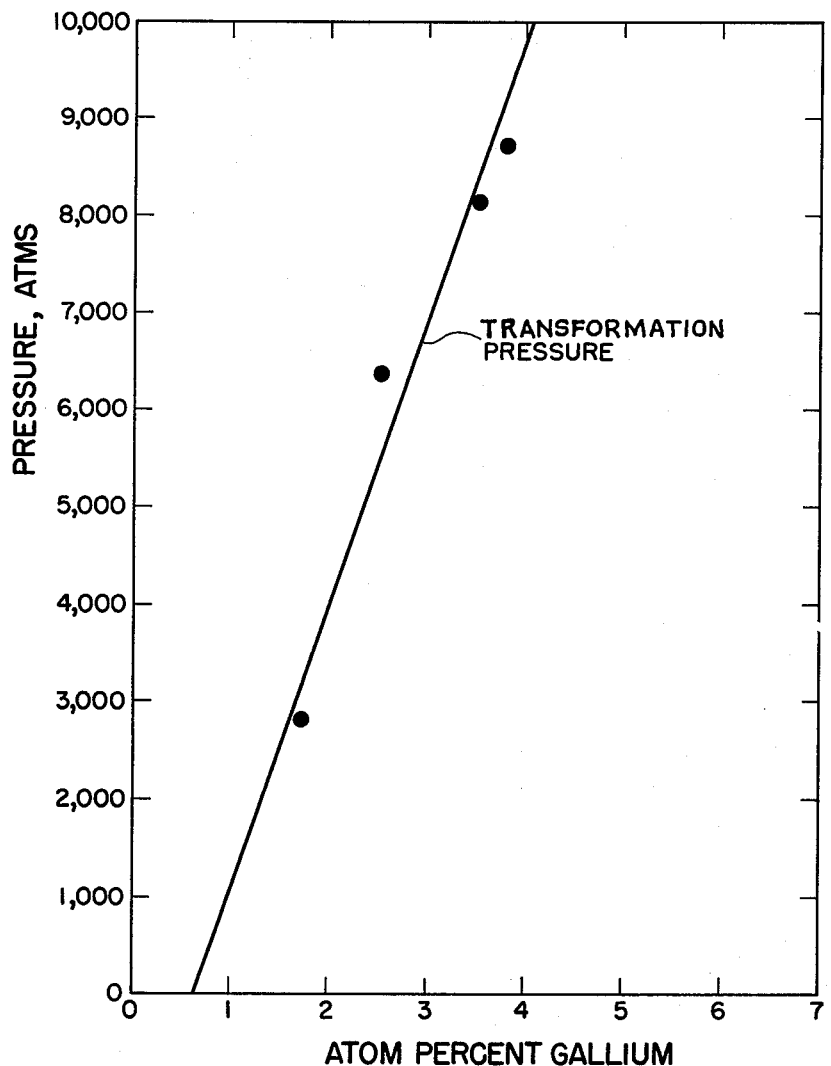
Figure 8:
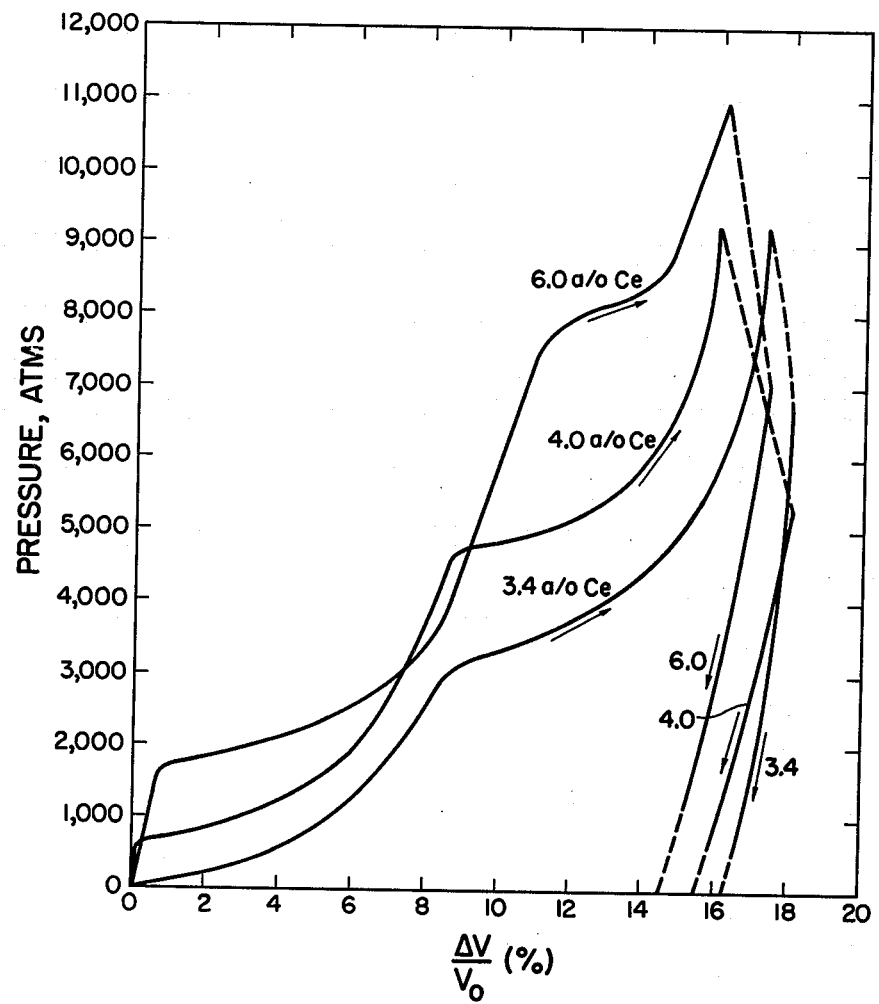
Figure 9:
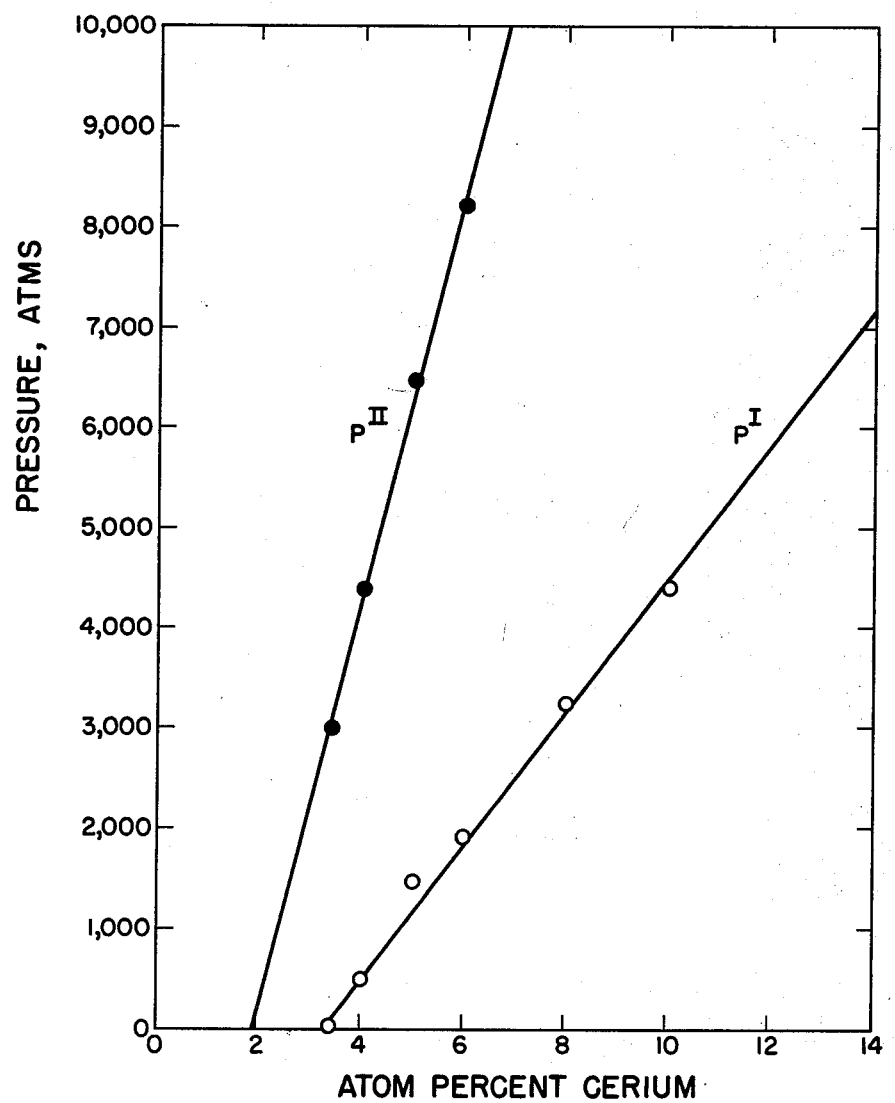

The present invention may be more readily understood by referring to the attached drawings, in which FIGURE 1 is a set of experimental compression curves for various Pu—Al alloys in accordance with the method outlined above, FIGURE 2 contains a curve showing the transformation pressure of such Pu—Al alloys as a function of the atom percent aluminum, FIGURES 3 and 4 present the same type of compression information as in FIGURES 1 and 2 for various Pu—Zn alloys, FIGURE 5 is a similar compression curve for one alloy of plutonium and indium, FIGURES 6 and 7 present the same type of compression information as in FIGURES 1 and 2 for Pu—Ga alloys, FIGURE 8 presents compression curves for various Pu—Ce alloys, showing both the low pressure transformations and the high pressure transformations, FIGURE 9 presents the transformation pressure of delta stabilized plutonium as a function of the atom percent cerium in the alloy for both transformations.

Figure 10:
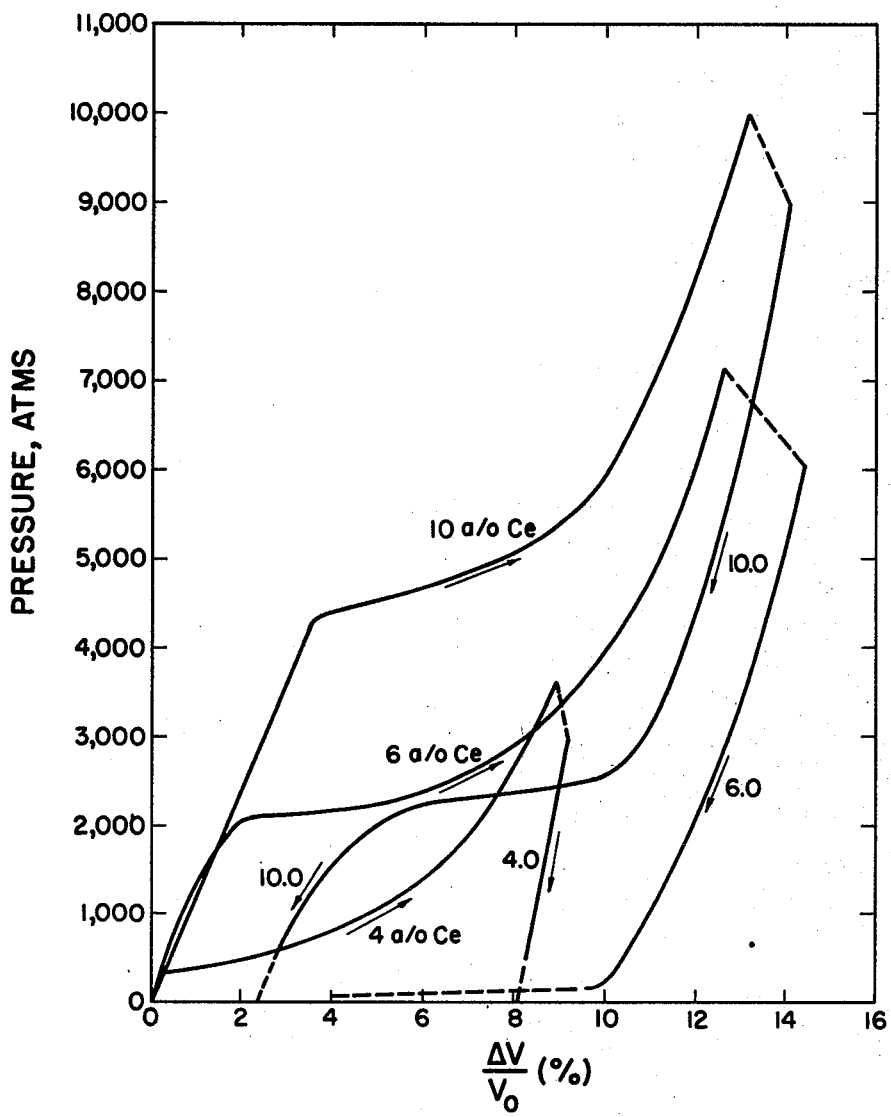
Figure 11:
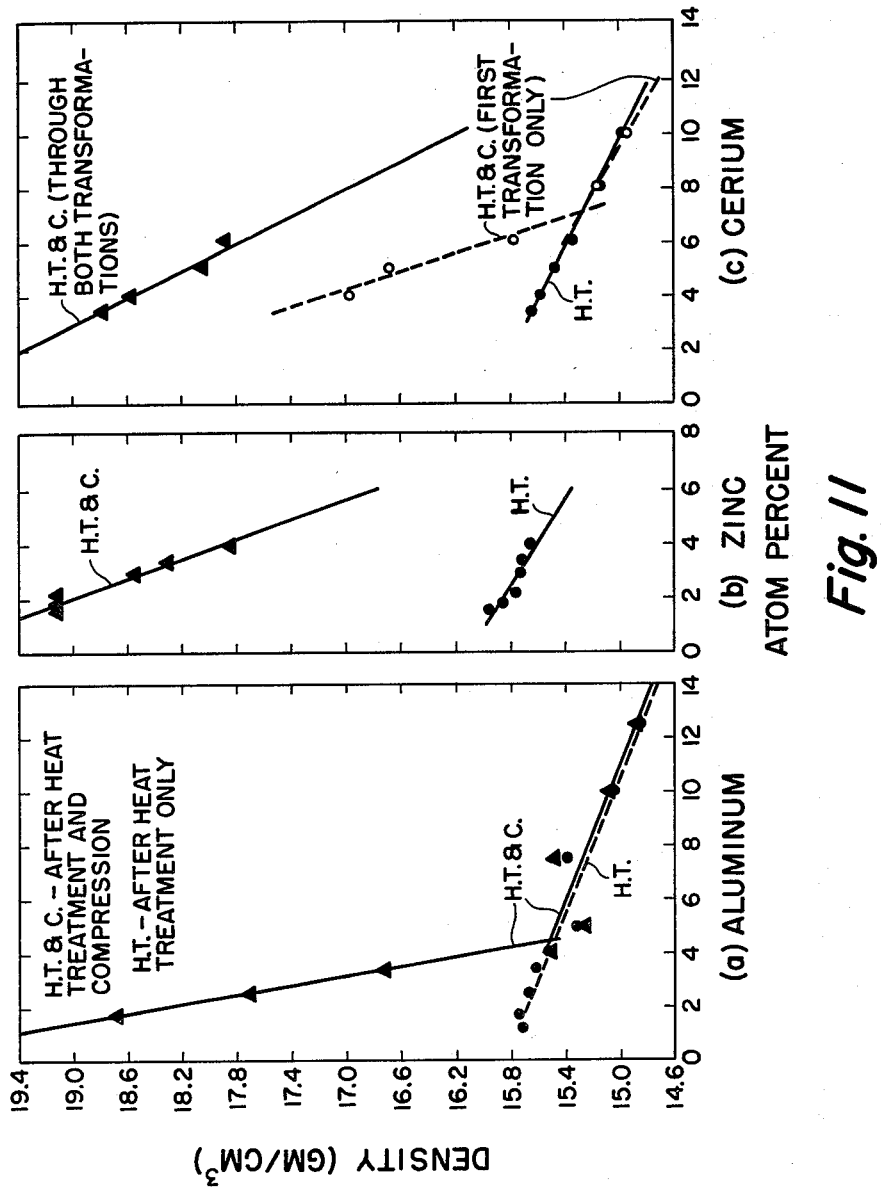
Figure 12:
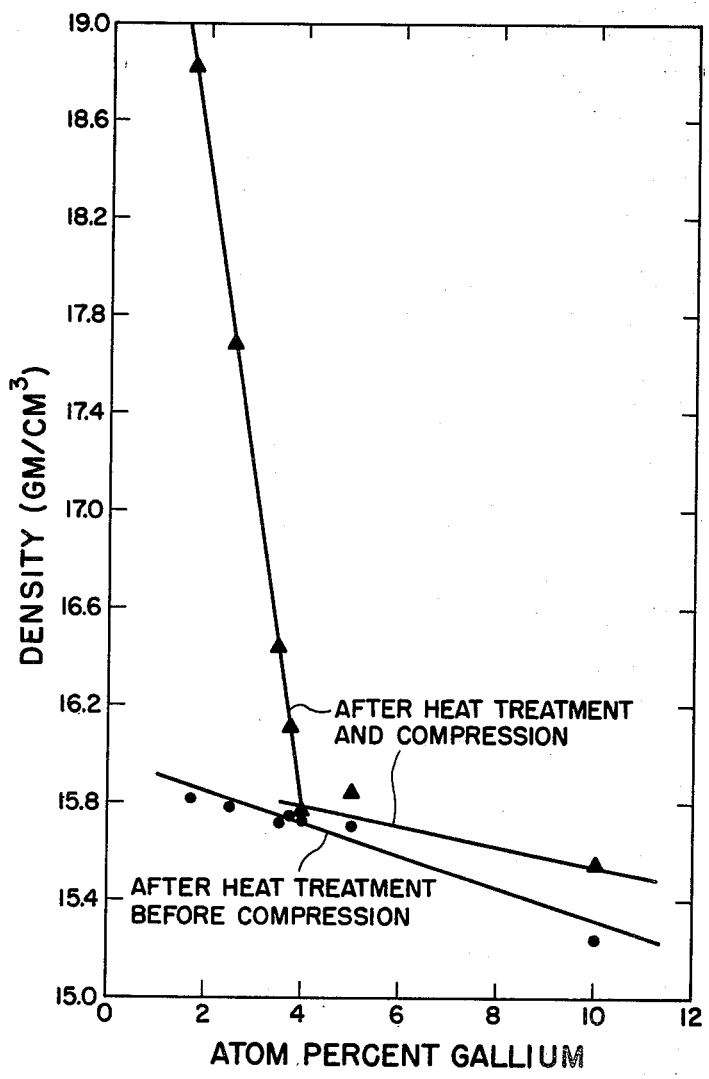
Figure 13:
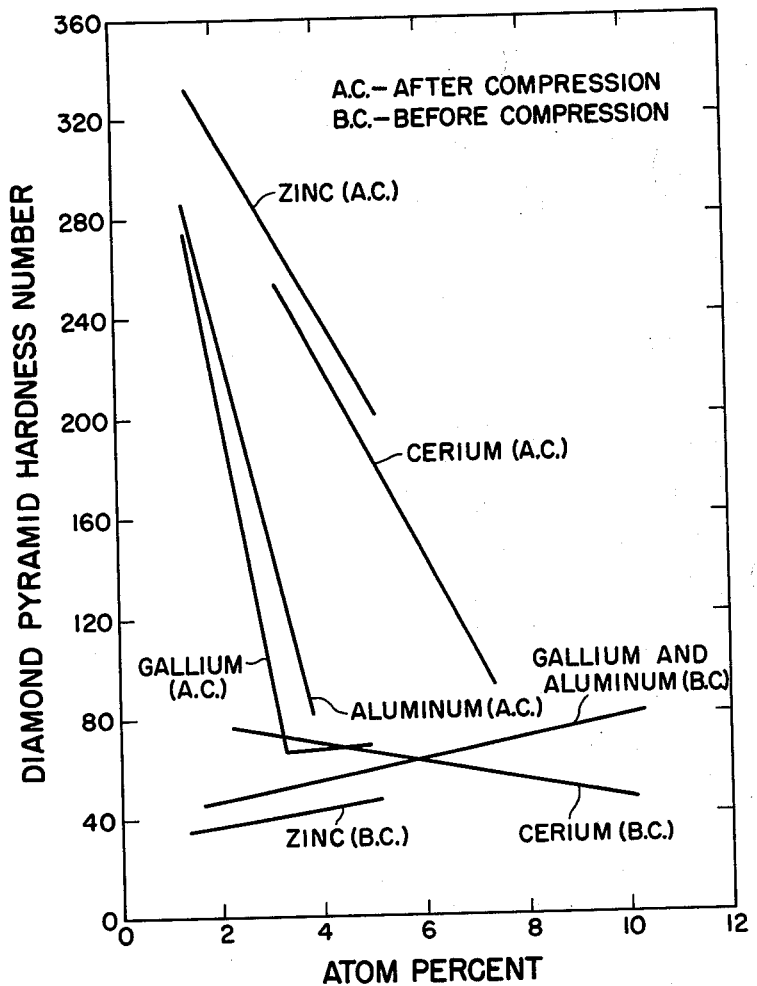
Figure 14:
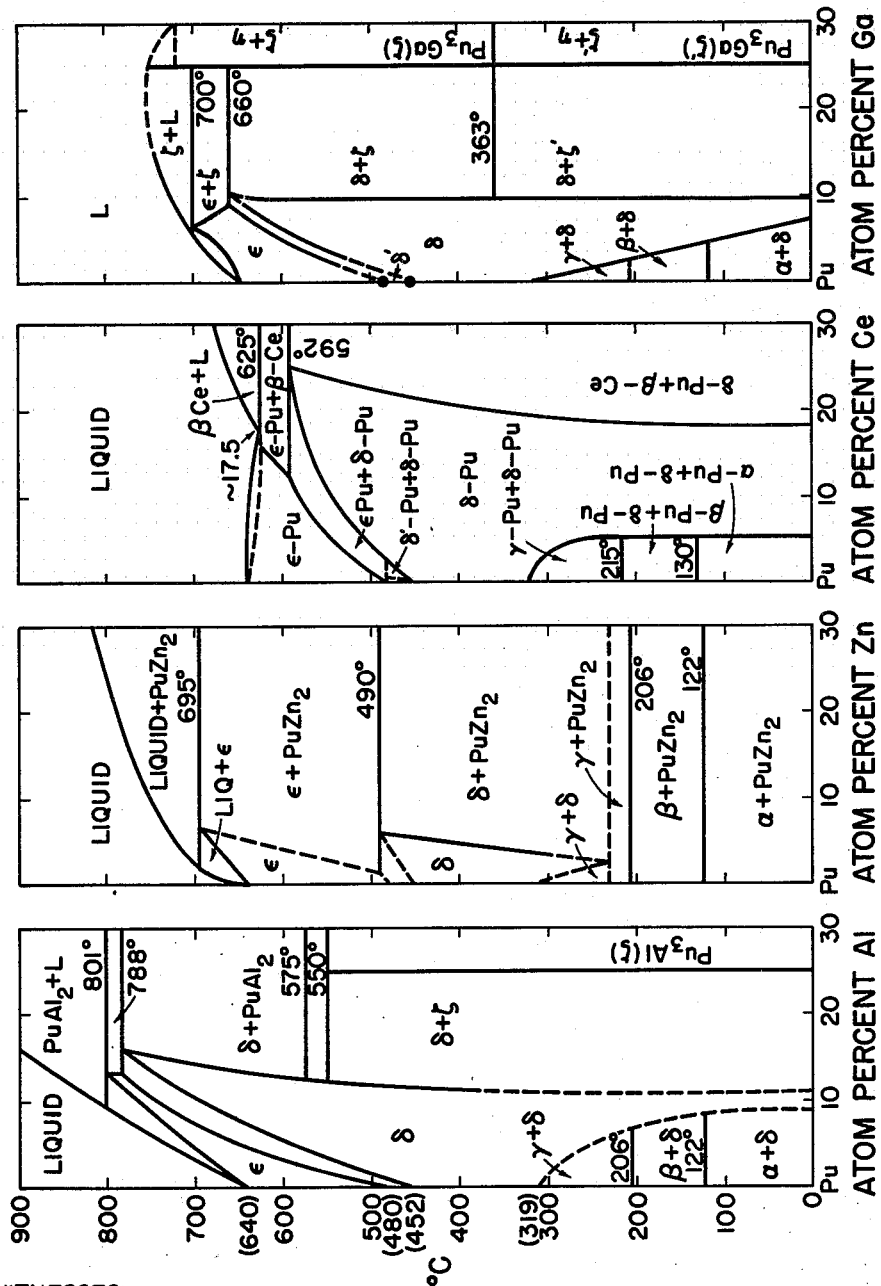
Figure 15:
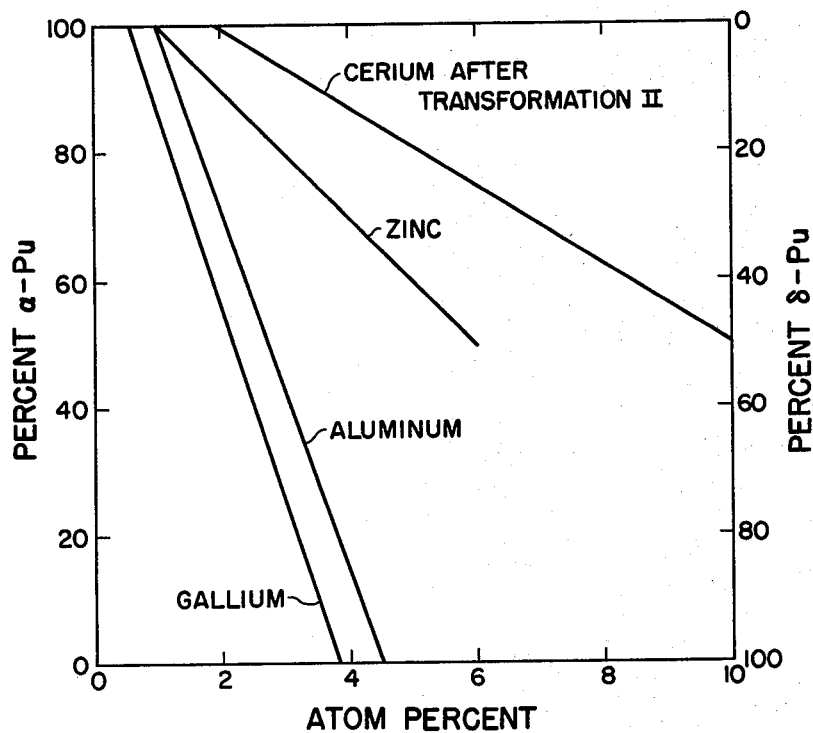

FIGURE 10 is a set of compression curves for Pu—Ce alloys, similar to those of FIGURE 8 but limited to the low pressure transformations, FIGURE 11 presents the densities of plutonium alloys containing aluminum, zinc and cerium as a function of the atom percent alloying element, both before compression and after compression, FIGURE 12 presents the same density information as in FIGURE 11 for Pu—Ga alloys, FIGURE 13 shows the dependence of hardness on atom percent of additive both before and after compression, FIGURE 14 contains the phase diagrams of each of the four aditives with plutonium, and FIGURE 15 depicts the percent alpha and delta allotropes of plutonium as a function of the atom percent additive in the alloy, showing how a particular predetermined allotropic distribution can be obtained with various additions of such elements in various proportions.

In addition to presenting the results of the indicated experiments in graphical form in the attached drawings, such results are listed below in Table 1. Transformation pressures listed in this table were obtained by extrapolating the pressure-volume curves at the transformation breaks. Volumes of transformation are the percent volume changes at the pressure of transformation, i.e., the difference between the $\Delta v./v_0$ values of the descending and ascending branches of each curve, and permanent volume changes are the percent volume changes of the alloy after compression and return to ambient pressure.

Table 1
SUMMARY OF DATA ON DELTA-STABILIZED Pu-RICH BINARY ALLOYS AT HIGH PRESSURES

| System | Composition | Maximum Pressure (atms.) | Transformation Pressure (atms.) | Transformation Volume $\Delta v./v_0$ (percent) | Permanent Volume Change [a] $\Delta v./v_0$ (percent) | Compressibility ($\times 10^6$/atm.) | Density Before Compression (gm./cc.) | Density After Compression (gm./cc.) |
|---|---|---|---|---|---|---|---|---|
| Pu-Al | 1.7 a/o Al | 8,880 | 2,040 | 16.0 | 16.0 | 4.1 | 15.73 | 18.67 |
|  | 2.5 a/o Al | 8,920 | 4,340 | 11.8 | 10.9 | 3.8 | 15.66 | 17.70 |
|  | 3.4 a/o Al | 8,920 | 7,020 | 6.8 | 6.7 | 4.0 | 15.60 | 16.71 |
|  | 4.0 a/o Al | 10,060 | [b] N.T. | | | 3.4 | 15.50 | 15.49 |
|  | 5.0 a/o Al | 8,670 | [b] N.T. | | | 4.5 | 15.31 | 15.26 |
|  | 7.5 a/o Al | 8,470 | [b] N.T. | | | 3.9 | 15.38 | 15.48 |
|  | 10.0 a/o Al | 8,670 | [b] N.T. | | | 3.4 | 15.04 | 15.07 |
|  | 12.5 a/o Al | 8,670 | [b] N.T. | | | 3.1 | 14.87 | 14.87 |
| Pu-Zn | 1.51 a/o Zn | 10,000 | 1,200 | 17.3 | 17.1 | 4.7 | 15.94 | 19.08 |
|  | 1.79 a/o Zn | 9,250 | 950 | 16.7 | 16.6 | 2.4 | 15.85 | 19.08 |
|  | 2.16 a/o Zn | 9,250 | 2,520 | 16.2 | 15.7 | 2.0 | 15.75 | 19.08 |
|  | 2.92 a/o Zn | 9,100 | 4,210 | 15.3 | 14.8 | 3.8 | 15.71 | 18.53 |
|  | 3.35 a/o Zn | 9,880 | 5,290 | 15.8 | 15.3 | 4.0 | 15.70 | 18.29 |
|  | 3.89 a/o Zn | 9,250 | 6,650 | 13.8 | 12.4 | 3.2 | 15.64 | 17.82 |
| Pu-In | 3.4 a/o In | 9,100 | 1,520 | 13.1 | 12.4 | 2.5 | 15.56 | 17.83 |
| Pu-Ce | 3.4 a/o Ce | 10,600 | I. <60 | ≥8.6 | | | 15.63 | |
|  | 3.4 a/o Ce | 10,600 | II. 3,000 | 9.1 | 16.3 | | | 18.76 |
|  | 4.0 a/o Ce | 9,880 | I. 500 | 8.4 | | I. 1.9 | 15.56 | |
|  | 4.0 a/o Ce | 9,880 | II. 4,380 | 8.3 | 15.5 | II. 4.2 | | 18.55 |
|  | 5.0 a/o Ce | 9,250 | I. 1,460 | 7.9 | | I. 1.9 | 15.46 | |
|  | 5.0 a/o Ce | 9,250 | II. 6,470 | 7.8 | 15.8 | | | 18.02 |
|  | 6.0 a/o Ce | 11,000 | I. 1,920 | 7.8 | | I. 3.0 | 15.31 | |
|  | 6.0 a/o Ce | 11,000 | II. 8,220 | 6.2 | 14.6 | II. 6.0 | | 17.86 |
|  | 8.0 a/o Ce | 10,000 | I. 3,230 | 6.9 | | I. 5.4 | 15.13 | 15.16 |
|  | 8.0 a/o Ce | 10,000 | II. ---- | [b] N.T. | | II. 6.5 | | |
|  | 10.0 a/o Ce | 10,000 | I. 4,400 | 5.7 | | I. 8.4 | 14.96 | 14.93 |
|  | 10.0 a/o Ce | 10,000 | II. ---- | [b] N.T. | | II. 6.8 | | |
| Pu-Ga | 1.7 a/o Ga | 9,100 | 2,810 | 16.7 | 16.0 | 3.6 | 15.81 | 18.81 |
|  | 2.5 a/o Ga | 10,000 | 6,360 | 12.0 | 8.7 | 3.6 | 15.78 | 17.57 |
|  | 3.5 a/o Ga | 10,600 | 8,140 | 10.3 | 3.9 | 3.3 | 15.72 | 16.43 |
|  | 3.75 a/o Ga | 11,000 | 8,700 | 8.8 | 3.1 | 3.8 | 15.75 | 16.10 |
|  | 4.0 a/o Ga | 10,060 | [b] | | | 4.1 | 15.73 | 15.76 |
|  | 5.0 a/o Ga | 8,920 | [b] | | | 3.7 | 15.70 | 15.84 |
|  | 10.0 a/o Ga | 9,100 | [b] | | | 3.7 | 15.24 | 15.55 |

[a] Values obtained by extrapolation of pressure-volume curves.
[b] N.T. means no transformation.

Turning now to FIG. 1, it can be seen that no transformations occur in the alloys containing 5.0 a/o or more aluminum within the pressure limit of the apparatus used, about 10,000 atmospheres, though it appears certain that such transformations will occur when such alloys are sufficiently compressed. Irreversible transformations occur in the alloys containing 1.7 a/o, 2.5 a/o and 3.4 a/o Al, the alloys after transformation containing a mixture of alpha and delta phases. All such alloys contained a small amount of the gamma and beta phases, generally less than 5%, as is true of all alpha and delta mixtures discussed below, and of mixtures in which the beta phase is dominant, i.e., there are small amounts of gamma and other phases. As can be seen from FIG. 1, for each of the latter group of alloys a pressure is reached at which there is a sudden decrease in volume with very little change in pressure. As the pressure increases, it becomes more difficult to obtain a decrease in volume. Finally a point is reached where the compressibility becomes quite small, the volume decreasing with increasing pressure only negligibly. At the peaks of the curves, maximum transformation has been completed, and the slight volume changes thereafter represent simple compression of the transformed alloy.

The apparent further decrease in volume as the pressure is released, indicated by the dashed line portion of the descending branch of each curve, has been found to be attributable to frictional resistance in the testing device. A newer design with greatly reduced friction indicates that the volume begins to increase immediately after the pressure is released, and that the descending branch of each curve should be shifted slightly to the left. The same is true for the compression curves of the other alloys described below.

As can be seen in FIG. 2, the transformation pressure varies linearly with the atom percent aluminum in the specimen. These linear characteristics have been extended to zero pressure, and the extrapolated zero transformation pressure is interpreted as determining the minimum amount of aluminum, 1.0 a/o, required to retain delta phase plutonium at room temperature with the heat treatment being used—homogenization in the delta field of plutonium and an air quenching. To verify this assumption, two alloys containing 0.8 and 1.2 a/o Al were thus treated and examined. Upon examination, the 0.8 a/o Al alloy was found to consist mostly of alpha phase plus some beta and gamma phases and had a density of 17.7 g./cc. The 1.2 a/o Al alloy consisting of delta phase had a density of 15.7 g./cc. It is here noted that such minimum additive will vary somewhat with the size of the alloy specimen and with the quenching rate, e.g., a water quench or a quench in liquid nitrogen will stabilize the delta phase with a somewhat lower alloying addition than an air quench, whereas air quenching of a specimen several inches in each dimension will require a higher content of the delta stabilizing additive.

Turning to FIG. 3, it can be seen that all of the zinc alloys tested under compression, maximum 3.9 a/o Zn, transformed irreversibly under pressure. The data from FIG. 3 was used to obtain the graphs of FIG. 4 in the same manner as for the aluminum alloys, the extrapolated transformation pressure curve in this case indicating a minimum zinc content of about 1.1 a/o to stabilize the delta phase with the heat treatment used.

In FIG. 5, the one compression curve for the Pu–In alloy containing 3.4 a/o In indicates another irreversible transformation of delta into a mixture of alpha plus delta, the transformation commencing at a pressure of 1520 atmospheres.

The compression curves for Pu–Ga alloys of FIG. 6 are quite similar to those for aluminum in FIG. 1, the curves indicating that with increasing gallium content the transformation tends to become more reversible, i.e., the amount of delta phase remaining after compression increases with increasing gallium content. Again the transformation pressure versus atom percent gallium curve of FIG. 7, when extrapolated to zero pressure, indicates the minimum gallium content, 0.6 a/o, required for stabilizing the delta phase with the heat treatment used in preparing the specimens.

In FIG. 8 the compression curves of various plutonium alloys stabilized with cerium additions indicate a somewhat different behavior. As illustrated, there is a low pressure transformation for each alloy plus a high pressure transformation. Further investigation of these alloys reveals that the low pressure transformation is one from the delta phase to the beta phase, and that the high pressure transformation is one from the beta phase to the alpha phase. The transformation pressures for both transformations as functions of atom percent cerium were plotted in FIG. 9, superscript I indicating the low pressure change and II the high pressure transition. Extrapolation shows that zero transformation pressures occur at 3.4 a/o Ce for the delta to beta transformation and at 1.9 a/o Ce for the beta to alpha transformation. A plutonium alloy containing between 1.9 and 3.4 a/o Ce, upon heat treatment of 450° C. and an air quenching, contains mostly beta phase plutonium. The minimum amount of cerium required to retain delta phase at room temperature with such a heat treatment is 3.4 a/o Ce.

In FIG. 10, there are presented compression curves for delta stabilized alloys containing 4.0, 6.0 and 10.0 a/o Ce, such alloys having been compressed through the lower pressure transformation and to higher pressures just short of the value required for the beta to alpha transition. These curves show that the transformations are irreversible for the 4.0 a/o Ce alloy, partly reversible in the 6.0 a/o Ce alloy, and completely reversible in the 10.0 a/o Ce alloy, the apparently permanent change in the volume of the latter being attributable to the aforementioned frictional resistance of the testing device. Use of the newer machine mentioned above shows that there is no permanent volume change in the 10.0 a/o Ce alloy. As will be shown in discussing the density data on such alloys below, this transformation of delta to beta plutonium was found to be completely reversible in alloys containing a minimum of 7.1 a/o Ce. Although most of the transformed plutonium in the irreversible transformation is beta phase, there is a small amount of gamma phase and some untransformed delta, the amount of untransformed delta increasing with increasing cerium content. The transformation occurs rapidly at room temperature, and the beta phase microstructure in the alloy containing 4.0 a/o Ce resembles that of a diffusionless martensite. This high pressure treatment can thus be used to retain beta phase plutonium that is free of voids and cracks at room temperature. The high pressure transformations illustrated in FIG. 8 are irreversible and result from a change of beta phase to alpha phase. After the transition, the alloys consist mostly of alpha phase essentially free of the microcracks and voids usually found in slowly cooled plutonium rich, alpha phase alloys.

The densities of the various alloys of aluminum, zinc and cerium are presented in FIGS. 11a, 11b and 11c, respectively, and for gallium in FIG. 12. In each case the curve obtained after heat treatment and before compression is linear and indicates a simple reduction in the density of the alloy with increasing amounts of the low density diluent. For aluminum and gallium, the curve obtained after both heat treatment and compression very nearly parallels the curve obtained before compression for the higher percentages of diluent. However, below a critical value of diluent content, the curve obtained after compression changes slope abruptly, indicating much larger increases in density as the amount of diluent is decreased. In the case of Pu—Al alloys, the two types of density curves intersect at 4.5 a/o Al, and this intersection is interpreted as indicating the composition below which delta plutonium stabilized with aluminum is metastable at room temperature and will transform irreversibly under compression. By the same token, Pu—Al alloys containing more than 4.5 a/o Al as a delta stabilizing addition are thermodynamically stable at room temperature and will transform reversibly under compression. Although the data presented in Table 1 indicates no transformation for Pu—Al alloys containing 4.0 a/o or more Al, such alloys will undoubtedly transform at higher pressures than the maximum to which they were subjected, 10,060 atmospheres.

Similarly, the intersection of the density curves for gallium in FIG. 12 indicates a critical value of 4.0 a/o Ga, below which such delta stabilized alloys are metastable at room temperature and above which the alloys are thermodynamically stable.

The density curves for cerium in FIG. 11c show both the densities after compression through the first transformation and densities after the second, high pressure transformation. The intersection of the former with the before compression curve occurs at 7.1 a/o Ce. Delta stabilized alloys containing less than this amount of cerium transform irreversibly under compression into mostly beta phase, while delta stabilized alloys containing more than 7.1 a/o Ce are thermodynamically stable at room temperature and undergo completely reversible delta to beta transformations. The extrapolated curves obtained before compression and after the high pressure transformation intersect at 16.3 a/o Ce, indicating that delta stabilized alloys containing more than 16.3 a/o Ce will transform from delta to beta to alpha as the pressure is increased, and from alpha to beta to delta as the pressure is decreased, i.e., both transformations are completely reversible. The critical points for these reversible transformations of Pu—Al, Pu—Ga and Pu—Ce alloys are summarized in Table 2. As indicated in FIG. 11b, all of the Pu—Zn alloys transformed irreversibly from delta to alpha at pressures below 10,000 atmospheres.

*Table 2*

EQUILIBRIUM TRANSFORMATION DATA FOR Pu-RICH Pu-Al, Pu-Ga AND Pu-Ce ALLOYS AT HIGH PRESSURES

| Critical Composition | Transformation (Reversible) | Transformation Pressure (atms.) |
| --- | --- | --- |
| 4.5 a/o Al | Delta to alpha | 10,200 |
| 4.0 a/o Ga | do | 10,000 |
| 7.1 a/o Ce | Delta to beta | 3,800 |
| 16.3 a/o Ce | Beta to alpha | 29,500 |

The hardnesses of the various alloys as a function of atom percent additive both before and after compression are presented graphically in FIG. 13, the after compression values for cerium in this case being for the high pressure transformation. Hardness values for such cerium alloys after only the first transformation are intermediate between the values before the first transformation and after the second, e.g., 67 DPHN before compression, 118 DPHN after the first compression and 237 DPHN after the second transformation for an alloy containing 4.0 a/o Ce. The curves obtained for the delta stabilized alloys prior to compression indicate in general little variation in hardness prior to transformation, while the hardness values obtained after compression and transformation indicate rapid increases in hardness with decreasing content of the delta stabilizing element. These curves also indicate that hardnesses can be controlled over a limited range by selecting the proper combination of alloying element and pressure. They also indicate that for a particular preselected hardness of the transformed alloy the smallest dilution of the plutonium will be obtained with gallium, followed by aluminum, cerium and zinc in the order indicated.

The plutonium rich portions of the phase diagrams of the Pu—Al, Pu—Zn, Pu—Ce and Pu—Ga systems are reproduced in FIG. 14. Effects of pressure on metastable, single-phase, binary alloys do not appear to have been determined previously. Some interesting correlations between the behaviors of such alloys under pressure and their respective phase diagrams can be inferred from the results of the present invention.

The intersection of the Pu—Al density curves at 4.5 a/o Al, referred to earlier in this paper, can be extrapolated to atmospheric pressure by assuming that this composition does not vary with pressure. This composition is then interpreted to be on the alpha plus delta/delta solvus phase boundary at room temperature (see FIG. 14a). This value, 4.5 a/o Al, is intermediate between the reported British value of 2.0±0.2 a/o Al and the Los Alamos value of 8.0 or 9.0 a/o Al, but these results are in disagreement with the Russian version of the Pu—Al diagram. This latter version shows a eutectoidal decomposition of delta phase into beta phase plus $Pu_3Al$ at about 175° C., and on cooling to room temperature alpha phase plus $Pu_3Al$ becomes the equilibrium state of such decomposed alloys. No evidence was found by the present inventors to substantiate this type of Pu—Al diagram. The metastable delta Pu—Al alloys transformed under pressure into either alpha or mixtures of alpha plus beta with some untransformed delta, and at no time was $Pu_3Al$ identified in any of the alloys by microscopic or X-ray methods, either before or after compression.

Correlations can also be inferred from the Ga–Pu phase diagram of FIG. 14d. If the alloy composition indicated at the intersection of the density curves (4.0 a/o Ga) as shown in FIG. 12 can be assumed not to change with pressure, then this composition should indicate a point lying on the delta/delta-plus-alpha solvus line (at room temperature and pressure) for the Pu–Ga phase diagram. This value (4.0 a/o Ga) agrees reasonably well with the value of 5.0±2.0 a/o Ga, which was obtained by extrapolating X-ray and density data from 200–250° C. to room temperature in a study of the Pu—Ga system.

The intersection of the Pu—Ce density curves at 7.1 a/o Ce can also be extrapolated to atmospheric pressure in the same way as described above for the Pu—Al and Pu—Ga alloys. This composition represents the beta plus delta/delta solvus phase boundary, and it agrees reasonably well with the value of 5 a/o Ce, obtained by extrapolation of high-temperature X-ray and metallographic data (see FIG. 14c).

It had been calculated that pure delta plutonium will transform to either gamma or delta-prime at 1300 atmospheres and at elevated temperatures, i.e., at pressures greater than 1300 atmospheres no delta phase can be formed regardless of temperature. As can be seen in Table 2, a delta-stabilized alloy containing 4.5 a/o Al will transform reversibly from delta to alpha at 10,200 atmospheres and one containing 4.0 a/o Ga at 10,000 atmospheres, whereas a delta-stabilized alloy containing 7.1 a/o Ce will transform reversibly to the beta phase at 3800 atmospheres. These reversible transformation pressures increase with increasing alloying contents (see FIGS. 2 and 9). Thus, the addition of aluminum, gallium or cerium has the effect of extending the delta-phase field with respect to pressure, similar to the effect produced by these alloy additions in extending the delta-phase field with respect to temperature (see FIGS. 14a and 14c). The stability of beta phase Pu—Ce alloys after compression suggests that cerium is probably more soluble in beta than in the gamma or alpha phases.

The Pu—Zn diagram shows a eutectoidal decomposition of delta phase into gamma phase plus $PuZn_2$ at about 235° to 243° C., and alpha phase plus $PuZn_2$ corresponds to the equilibrium state of decomposed alloys at room temperature (see FIG. 14b). Delta-stabilized Pu—Zn alloys are, therefore, actually metastable at room temperature and should transform under pressure to a more stable state. All delta-phase Pu—Zn alloys studied did transform under compression, substantially in agreement with this Pu—Zn phase diagram.

To enable those skilled in the art to practice the present invention, there is presented in FIG. 15 a series of graphs indicating the allotropic compositions of various delta stabilized plutonium alloys, each as a function of the atom percent delta stabilizing additive. These curves all represent the allotropic composition after maximum compression, i.e., compression to such a high pressure that virtually no change in density is obtained thereafter. Such curves have been derived from the density data of Table 1 and are easily retranslated into densities by the use of FIGS. 11 and 12. If it is desired that the plutonium be equally distributed between the alpha and delta phases, FIG. 15 indicates that this can be done by alloying additions of any one of 2.2 a/o Ga, 2.9 a/o Al, 6.0 a/o Zn, or 10.0 a/o Ce. Such alloys are prepared by the heat treatment outlined above, viz., homogenization in the delta field and air quenching to room temperature followed by the transformation under pressure as graphically indicated in FIGS. 1, 3, 6 and 8. The choice of additive will depend to some extent upon the dilution which can be tolerated in the design and the hardness desired in the final product, and some compromise may be necessary. The hardness will be determined in accordance with FIG. 13, and the dilution by the neutronic calculations of the designer. Regardless of the particular alloying elements selected, the final product will be free of cracks and voids, and will be stable at room temperature and temperatures at least within the alpha range of unalloyed plutonium and at pressures likely to be encountered in an operating reactor, e.g., pressures less than about 8000 atmospheres.

It is here pointed out that it is possible to obtain alloys of alpha and delta plutonium for a particular alloying addition other than the one which would be indicated by the appropriate curve of FIG. 15. This is accomplished by compressing the delta stabilized alloy of such composition to some maximum pressure intermediate between the initial transformation pressure and the pressure necessary for maximum transformation. Thus in FIG. 1, for example, if the delta stabilized alloy containing 3.4 a/o Al is compressed to some value such as 8000 atmospheres the permanent volume change will be somewhere in the neighborhood of 4%, indicating that only a fraction of the maximum possible transformation from delta to alpha plutonium has been achieved. Such transformations are somewhat more difficult to accomplish than the maximum possible transformation at the peaks of the curves. They are easiest in the case of an alloy such as the indium alloy indicated in FIG. 5 because of the greater slope of transformation as compared to the almost horizontal form of the transformation curves of aluminum, zinc or gallium in FIGS. 1, 3 and 6.

It is also to be noted that the Ce—Pu alloys can be transformed into alloys in which the plutonium is predominantly of the beta phase, and thus obtain the intermediate physical characteristics of this phase (density=17.6 g./cc., coefficient of thermal expansion=$34.7 \times 10^6$). For instance, a 4.0 a/o Ce alloy compressed to 3600 atmospheres contained 77% beta phase, 14% delta phase, 9% gamma phase and no alpha.

What is claimed is:

1. A method of making stabilized binary alloys of plutonium with said binary element being selected from the class consisting of aluminum, zinc, and gallium, said element being present in said alloy in the range of 1.0 to 4.0 atomic percent, whereby a controlled mixture of alpha and delta phases are obtained in such alloys, the method consisting of continuing to compress said alloy to at least a pressure marked by rapid increase in density of the alloy with a negligible increase in pressure, and wherein the resulting volume decrease of the alloy with increasing pressure is negligible.

2. A method of making a stabilized plutonium base alloy containing from 1.0 to 4.5 atom percent aluminum to effect maximum transformation of said plutonium to the alpha phase, comprising compressing said alloy to its transformation pressure and continuing to compress said alloy until the volume decrease with increasing pressure is negligible.

3. A method of making a stabilized plutonium base alloy containing from 1.1 to about 4.0 atom percent zinc to effect maximum transformation of said plutonium to the alpha phase, comprising compressing said alloy to its transformation pressure and continuing to compress said alloy until the volume decrease with increasing pressure is negligible.

4. A method of making a stabilized plutonium base alloy containing from 0.6 to 4.0 atom percent gallium to effect maximum transformation of said plutonium to the alpha phase, comprising compressing said alloy to its transformation pressure and continuing to compress said alloy until the volume decrease with increasing pressure is negligible.

References Cited by the Examiner

UNITED STATES PATENTS

| | | | |
|---|---|---|---|
| 1,685,915 | 10/28 | Gero | 75—122.7 |
| 2,867,530 | 1/59 | Coffinberry | 75—122.7 |
| 2,929,706 | 3/60 | Cramer et al. | 75—122.7 |

OTHER REFERENCES

Darken et al.: "Physical Chemistry of Metals" (1953), pages 306–308, McGraw-Hill Book Co., New York.

Finniston et al.: "Metallurgy and Fuels," September 1956, pp. 354–360, 388–396.

Runnals: "AECL–543," January 1958, pp. 18–20.

"Reactor Core Materials," May 1958, vol. 1, No. 2, pp. 8–10.

CARL D. QUARFORTH, *Primary Examiner.*

ROGER L. CAMPBELL, LEON D. ROSDOL, WILLIAM G. WILES, *Examiners.*